US011565796B2

(12) United States Patent
Evans et al.

(10) Patent No.: US 11,565,796 B2
(45) Date of Patent: Jan. 31, 2023

(54) AIRCRAFT ASSEMBLY

(71) Applicant: SAFRAN LANDING SYSTEMS UK LTD, Gloucester (GB)

(72) Inventors: Royston Alan Evans, Gloucester (GB); Paul Shaw, Gloucester (GB)

(73) Assignee: Safran Landing Systems UK LTD

( * ) Notice: Subject to any disclaimer, the term of this patent is extended or adjusted under 35 U.S.C. 154(b) by 0 days.

(21) Appl. No.: 17/503,930

(22) Filed: Oct. 18, 2021

(65) Prior Publication Data

US 2022/0033069 A1    Feb. 3, 2022

Related U.S. Application Data

(63) Continuation of application No. 16/223,265, filed on Dec. 18, 2018, now Pat. No. 11,180,244.

(30) Foreign Application Priority Data

Dec. 28, 2017 (EP) .................................. 17210865

(51) Int. Cl.
*B64C 25/24* (2006.01)
*F15B 15/06* (2006.01)
(Continued)

(52) U.S. Cl.
CPC .............. *B64C 25/22* (2013.01); *B64C 25/12* (2013.01); *B64C 25/24* (2013.01); *B64C 25/26* (2013.01);
(Continued)

(58) Field of Classification Search
CPC ......... B64C 25/22; B64C 25/24; B64C 25/26; B64C 25/12; F15B 11/10; F15B 2211/20515; F15B 2211/212
See application file for complete search history.

(56) References Cited

U.S. PATENT DOCUMENTS 8,701,400 B2    4/2014  Kondo et al.
2006/0208501 A1  9/2006  Harvey et al.
(Continued)

FOREIGN PATENT DOCUMENTS

EP    2003056 A2    12/2008
EP    2816237 A1    12/2014
(Continued)

OTHER PUBLICATIONS

Machine Translation of JP 2009047237. (2022).*
(Continued)

*Primary Examiner* — Abiy Teka
*Assistant Examiner* — Daniel S Collins
(74) *Attorney, Agent, or Firm* — RatnerPrestia

(57) ABSTRACT

An aircraft assembly having: a first part; a second part, the second part being movably mounted with respect to the first part; an electro-hydraulic actuator coupled between the second part and a first anchor point, the actuator comprising a cylinder defining a bore and a piston and rod assembly slidably mounted within the bore and an active chamber within which an increase in fluid pressure causes the actuator to change during a first phase between first and second extension states to move the second part relative to the first part. The electro-hydraulic actuator further includes a hydraulic fluid supply circuit comprising a piezo-electric pump operable to supply pressurised fluid to the active chamber to change the actuator between first and second extension states.

22 Claims, 11 Drawing Sheets

(51) Int. Cl.
  *B64C 25/22* (2006.01)
  *B64C 25/26* (2006.01)
  *B64C 25/12* (2006.01)
  *F15B 1/02* (2006.01)
  *F15B 11/10* (2006.01)
  *B64C 25/18* (2006.01)

(52) U.S. Cl.
  CPC .............. *F15B 1/024* (2013.01); *F15B 11/10* (2013.01); *F15B 15/06* (2013.01); *B64C 25/18* (2013.01); *F15B 2211/20515* (2013.01); *F15B 2211/212* (2013.01); *F15B 2211/30505* (2013.01); *F15B 2211/55* (2013.01); *F15B 2211/7052* (2013.01); *F15B 2211/72* (2013.01)

(56) References Cited

U.S. PATENT DOCUMENTS

2013/0119196 A1    5/2013   Lindahl et al.
2017/0203833 A1    7/2017   Schmidt

FOREIGN PATENT DOCUMENTS

JP       2009047237 A    3/2009
JP       2011102604 A    5/2011

OTHER PUBLICATIONS

Extended European Search Report for European Application No. 17 210 865.6, dated Mar. 7, 2018, 8 pages.
European Communication for European Application No. 17 210 865.6, dated May 28, 2020, 5 pages.
Entire patent prosecution history of U.S. Appl. No. 16/233,265, filed Dec. 18, 2016, entitled, "Aircraft Assembly."
Sirohi, J., et al., "Development of a compact piezoelectric-hydraulic hybrid actuator", Proceedings of SPIE, Smart Structures and Materials 2001: Smart Structures and Integrated Systems, Aug. 16, 2001, vol. 4327, pp. 401-412, XP055448442.
Extended European Search Report for European Application No. 21 198 233.5, dated Feb. 11, 2022, 11 pages.

* cited by examiner

AIRCRAFT ASSEMBLY

This application is a continuation of U.S. application Ser. No. 16/223,265, filed on Dec. 18, 2018, which claims the benefit of and priority to European Application EP17210865.6, filed on Dec. 28, 2017, the contents of both of which are incorporated herein by reference.

BACKGROUND OF THE INVENTION

An aircraft assembly can comprise a first part movably mounted with respect to a second part. An actuator can be provided to move the first part It is common for an aircraft assembly actuator to be driven by a centralized aircraft hydraulic system that is coupled to a plurality of aircraft assembly actuators mounted on the aircraft.

The present inventors have devised a new type of aircraft assembly actuator that can result in an aircraft assembly of reduced mass, size and/or complexity.

SUMMARY OF THE INVENTION

A first aspect of the invention provides an aircraft assembly comprising a first part and a second part, the second part being movably mounted with respect to the first part. An electro-hydraulic actuator is coupled between the second part and a first anchor point. The actuator comprises a cylinder or outer casing defining a bore, a piston and rod assembly, the piston of which is slidably mounted within the bore to move linearly along the bore with the rod projecting from the cylinder so as to change the actuator between extension states. The bore incudes an active chamber configured such that an increase in fluid pressure within the active chamber causes the actuator to change during a first phase between first and second extension states to move the second part relative to the first part. The electro-hydraulic actuator comprises or is coupled to a hydraulic fluid supply circuit. The hydraulic fluid supply circuit includes a piezo-electric pump operable to supply pressurized fluid to the active chamber to change the actuator between the first and second extension states.

The use of a piezo-electric pump to drive the actuator can result in an aircraft assembly of reduced mass, size, complexity and/or of reduced maintenance requirement.

The assembly can be arranged such that the second part can be moved relative to the first part with a power input of less than or equal to 500 Watts. Such assemblies can use a wider range of electro-hydraulic actuators and/or a single electro-hydraulic actuator to drive the second part relative to the first part.

The hydraulic fluid supply circuit can further comprises an accumulator for storing hydraulic fluid. The hydraulic fluid supply circuit can be arranged with a single accumulator, which is dedicated to the actuator, and a single pump, which is dedicated to the actuator. Such assemblies can provide a simple, self-contained solution, minimizing interconnecting hydraulic pathways.

The actuator can be configured as a single acting actuator, driven to either extend or retract for example. Such assemblies can use a wider range of electro-hydraulic actuators and/or a single electro-hydraulic actuator to drive the second part relative to the first part.

The aircraft assembly can comprise an aircraft landing gear assembly. The aircraft landing gear assembly can further comprise: a main strut arranged to be movably coupled to an aircraft to be movable between a stowed condition for flight and a deployed condition for take-off and landing; a multi linkage side stay coupled between the main strut and a side stay anchor point and having a locking condition in which the side stay reacts attempted movement of the main strut from the deployed position and a passive condition in which the stay permits movement of the main strut to the stowed condition; a multi linkage lock stay coupled between the side stay and a lock stay anchor point and having a locking condition in which it reacts attempted movement of the side stay from the locking condition and a passive condition in which the lock stay permits movement of the main strut to the stowed condition. In such embodiments the second part can comprise a link of the lock stay and the first part can comprise another part of the assembly such as the other link of the lock stay, the stay or one of the stay links, or the main strut for example. The actuator in such embodiments is a lock stay actuator arranged during the first phase to apply an unlocking force to the lock stay to change the lock stay from the locking condition to the unlocking condition. The assembly further comprises a retraction actuator arranged to move the main strut between the deployed and stowed conditions, wherein once the lock stay actuator has attained the second extension state, operation of the retraction actuator biases the lock stay actuator to change during a second phase to a third extension state in which the main strut is in the stowed condition. The present inventors found that such assemblies are particularly suited to a piezo-electric driven actuator due to the first phase having a relatively small stroke, and thus lower actuator flow requirement, in comparison to the second phase.

The actuator can further comprise a passive chamber on an opposite side of the piston with respect to the active chamber, the passive chamber containing hydraulic fluid in fluid communication with the accumulator, wherein the hydraulic circuit further comprises a pump bypass check valve arranged in parallel with the pump, the pump bypass check valve being arranged to permit flow of hydraulic fluid from the passive chamber to the active chamber but inhibit the flow of hydraulic fluid from the active chamber be easily be driven by an external force, such as the retraction actuator, during the second phase and/or can dampen a change between extension states during the second phase by fluid passing through the hydraulic supply circuit.

The actuator can be arranged such that the increase in fluid pressure within the active chamber causes the fluid to act directly on the rod piston. Thus, the rod piston can define a moveable surface of the active chamber, with the rod piston being provided with one or more dynamic seals arranged slide in sealing engagement with an inner surface of the cylinder to inhibit fluid flow across the rod piston. This can result in a simple actuator design.

The hydraulic circuit can further comprise a choke assembly disposed flow-wise between the pump and the active chamber, the choke assembly comprising a choke flow restrictor in parallel with a choke check valve, the check valve being biased closed and being arranged to open under fluid pressure when the retraction actuator biases the lock stay actuator to change during the second phase to the third extension state. This can provide an actuator which can easily be driven by an external force, such as the retraction actuator, during the second phase and/or can dampen a change between extension states during the second phase by fluid passing through the hydraulic supply circuit.

The choke assembly can further comprise a pressure release valve configured to open if the reverse flow of fluid, from the active chamber through the choke flow restrictor towards the accumulator, exceeds a predetermined pressure.

The actuator can comprise an actuation piston which is distinct from, and movable relative to, the piston of the piston and rod assembly. The actuation piston can be annular and can receive the piston rod. The actuation piston can including one or more dynamic seals arranged slide in sealing engagement with an inner surface of the cylinder to inhibit fluid flow across the actuator piston. The actuator can be arranged such that an increase in fluid pressure in the active chamber causes fluid to act on the actuation piston, which moves into contact with the rod piston to move the rod piston to causes the actuator to change between the first and second extension states. Thus, the actuator piston defines the movable surface of the active chamber. The rod piston can be shaped to permit hydraulic fluid within the passive chamber to move through or beyond it. This internal 'lost motion' arrangement can enable a relatively simple hydraulic fluid supply circuit because the piston rod can be driven by an external force without forcing fluid around the hydraulic circuit, or with less fluid being forced around the circuit in comparison to an arrangement where fluid in the passive chamber is inhibited from moving across the rod piston by a dynamic seal.

The actuator can further comprise a resilient biasing member arranged to bias the actuator to change from the second extension state to the first extension state, the biasing force being less than that applied by the pump during the first phase to cause the actuator to change between first and second extension states to move the second part relative to the first part. The actuator can therefore automatically reset when the pump is off. Such assemblies can provide a relatively simple hydraulic fluid supply circuit and are particularly suitable for an aircraft landing gear up lock assembly.

The assembly can further comprise: a main strut arranged to be movably coupled to an aircraft to be movable between a stowed condition for flight and a deployed condition for take-off and landing, the main strut being provided with an up-lock engagement formation such as a bar or hoop assembly; an up-lock hook movable between and unlocking condition, where the hook is outside the swept volume of the up-lock formation as the main strut moves between the deployed and stowed conditions, and a locking condition, where the hook is at least partially within the swept volume of the up-lock formation such that the hook can engage with the up-lock formation to hold the main strut in the stowed condition, wherein the actuator comprises an up-lock actuator coupled between the hook and an up-lock anchor point such that as the actuator changes between first and second extension states the up-lock hook releases the up-lock formation.

The hydraulic fluid can comprise oil.

The actuator, pump and reservoir can be formed as single unit, requiring only electric connections to the wider aircraft environment.

The actuator and hydraulic circuit can comprise no control valves.

The actuator can be directly connected to the pump with no intermediate control functions or elements.

The actuator can have a unidirectional load capability.

An aircraft landing gear assembly can comprise a main strut in the form of a telescopic shock absorbing strut and/or a wheel assembly mounted to a free end of the main strut.

A second aspect of the invention provides an aircraft comprising an aircraft assembly according to the first aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
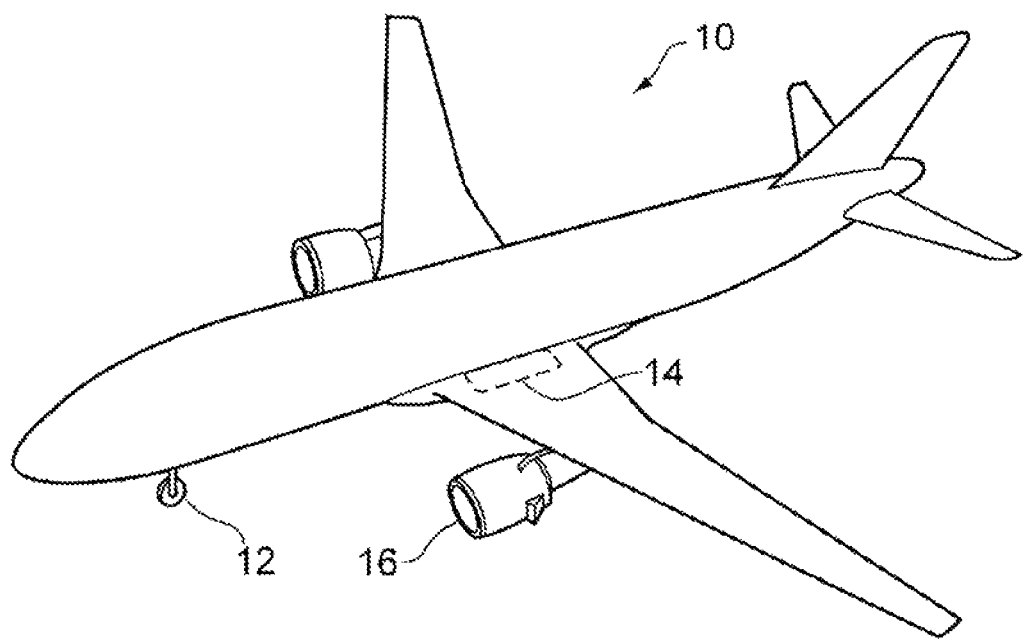
FIG. 1 is a diagram of an aircraft.

FIG. 1 is a diagram of an aircraft 10. The aircraft 10 includes assemblies such as a nose landing gear 12, main landing gear 14 and engines 16. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Referring now to FIGS. 2a to 2e, an aircraft assembly, namely an aircraft landing gear assembly, is shown generally at 14. The landing gear assembly 14 includes a foldable stay 18, a lock stay 20 and a down lock spring assembly 22 mounted to the stay 18 and arranged to urge the lock stay 20 to assume a locked state. The landing gear assembly also includes a main shock absorber strut 24, comprising a main fitting 26 and a sliding tube 28, as well as a wheel and brake assembly 30.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the main strut such that extension and retraction of the actuator results in movement of the main strut between deployed and stowed conditions.

Figure 2A:
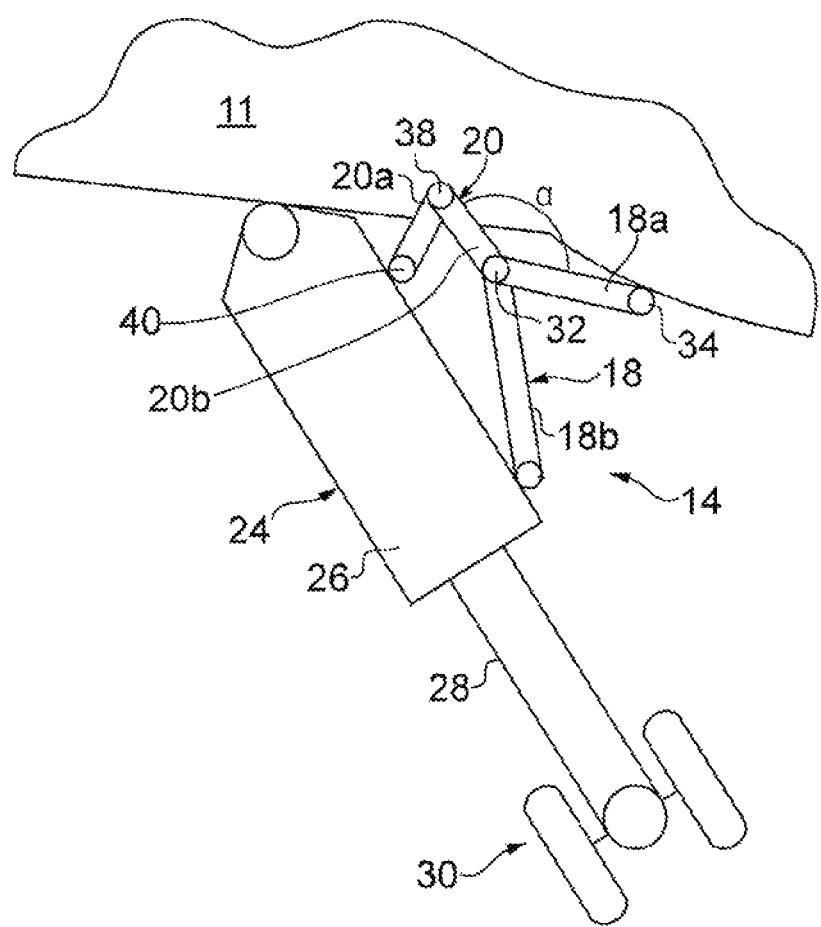
FIGS. 2a to 2g are diagrams of aircraft landing gear assemblies.

The stay 18 serves to support the orientation of the main fitting 26 when the landing gear is in the deployed condition. The stay 18 generally includes a two bar linkage that can be unfolded to assume a generally straight or aligned, over center condition in which the stay 18 is locked to inhibit movement of the main fitting, as shown in FIGS. 2c and e. When the stay is broken, it no longer prevents pivotal movement of the main fitting 26 and the main fitting 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorbing strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the main fitting 26.

The lock stay 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the main fitting 26. A lower end of the lower link arm 20b defines a lug that is pivotally coupled to lugs of the stay arms 18a, 18b via the pivot pin 32. Lugs of the upper stay arm 18a are disposed between the lugs of the lower stay arm 18b and the lugs of the lower link arm 20b.

Figure 2B:
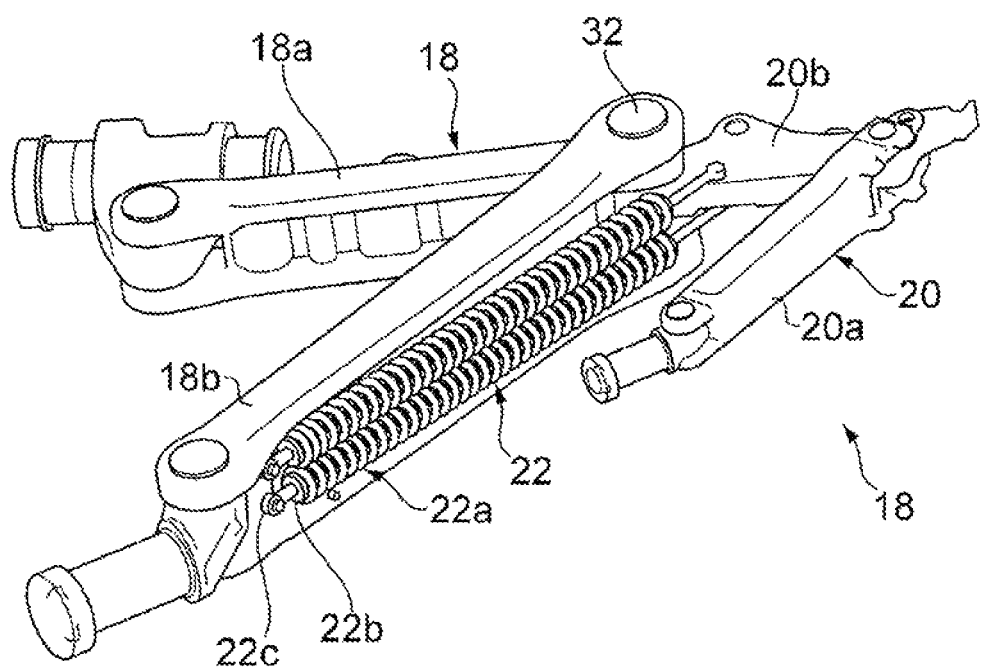
Figure 2C:
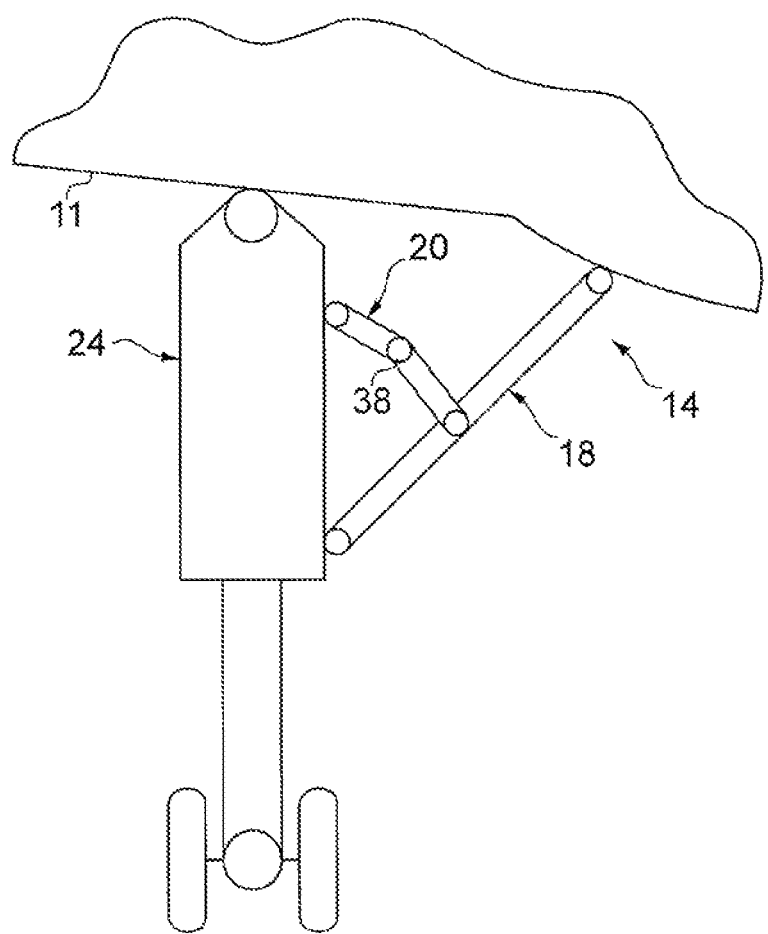
Figure 2D:
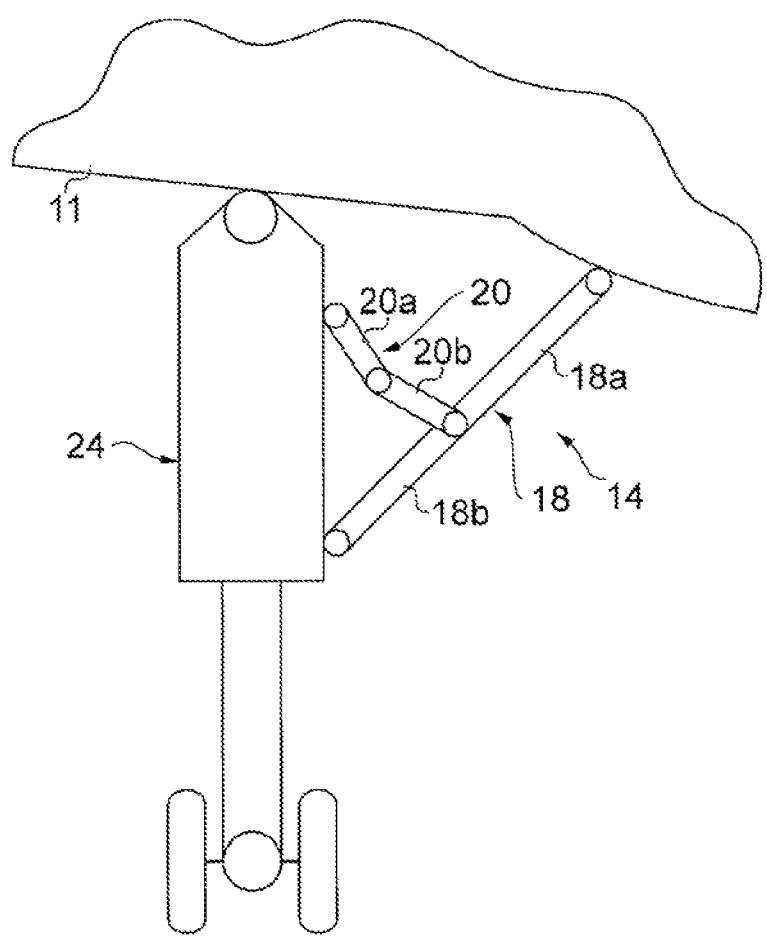

When the lock stay 20 is in the locked condition, as illustrated in FIG. 2d, e, the upper and lower link arms 20a, 20b are generally longitudinally aligned or coaxial, and can be 'over-center', such that the lock stay 20 is arranged to oppose a force attempting to fold the stay 18, so as to move the landing gear assembly from the deployed condition towards the stowed condition. The lock stay 20 must be broken to enable the stay 18 to be folded, thereby permitting the main fitting 26 to be moved by the retraction actuator towards the stowed condition.

One or more down lock springs 22 are generally provided to assist in moving the landing gear assembly to the deployed condition and locking it in that state by making the lock stay. Down lock springs 22 also inhibit the lock stay accidentally being unlocked. Down lock springs 22 are generally titanium alloy coil springs, which can be coupled between the lock stay and another part of the landing gear assembly, such as an arm of the stay assembly, as shown in FIGS. 2b and 2e.

The spring assembly 22 is arranged to bias the lock stay 20 towards the locked condition by way of spring tension. A distal end of the spring 22a is coupled to the lower stay arm 18b via a lower engagement formation 22b which in turn is coupled to an anchor point defined by the lower connector 22c.

Figure 2E:
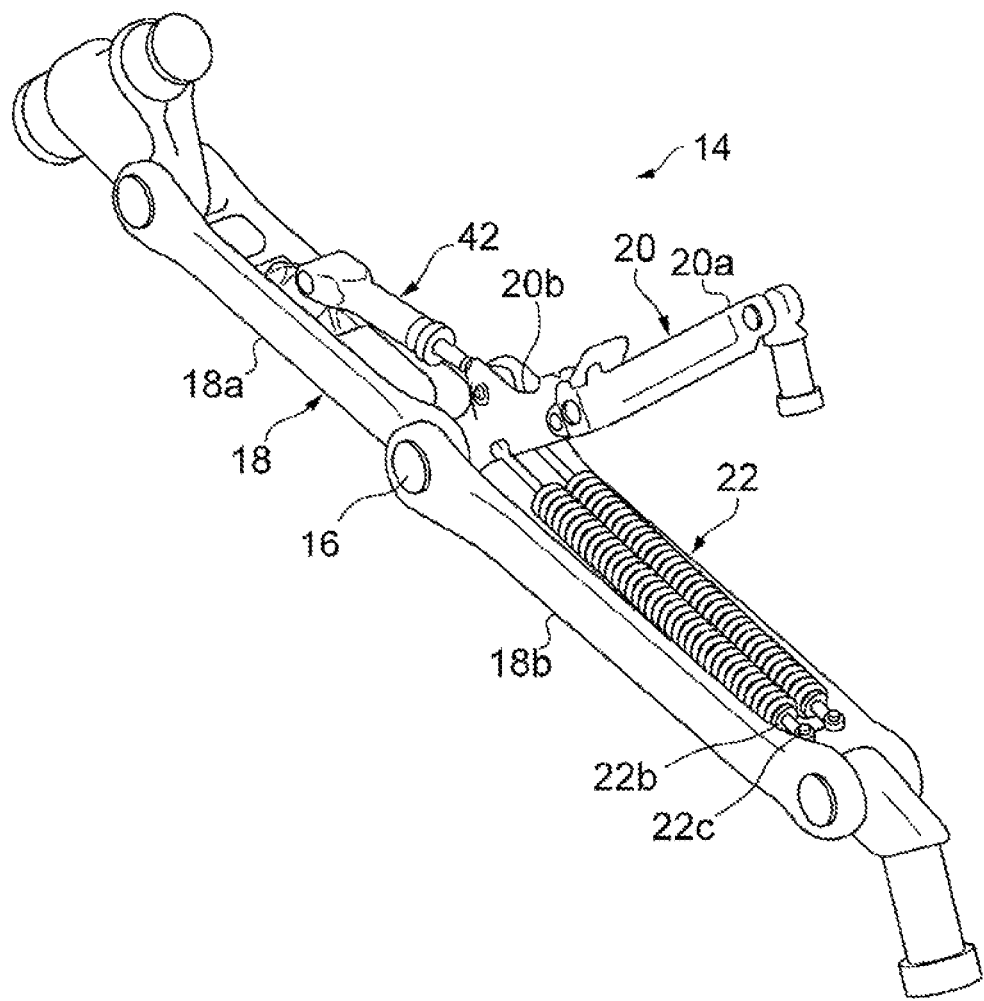

The coil spring of the spring assembly 26 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress.

Referring to FIG. 2e, a lock stay actuator 42 is coupled between the upper stay arm 18a and lower link arm 20b and arranged to pivotally move the link arms 20a, b so as to 'lock' and 'unlock' the lock stay 20, as illustrated in FIG. 2c. The actuator 42 can break the lock stay 20 against the down lock spring bias, allowing the landing gear assembly to be folded and stowed as described previously.

Figure 2F:
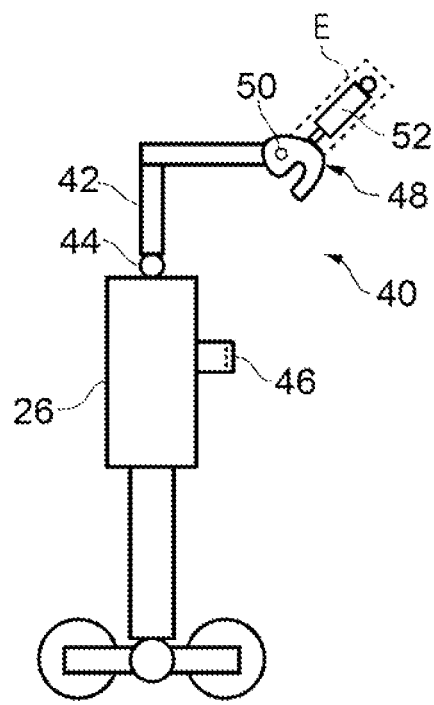
Figure 2G:
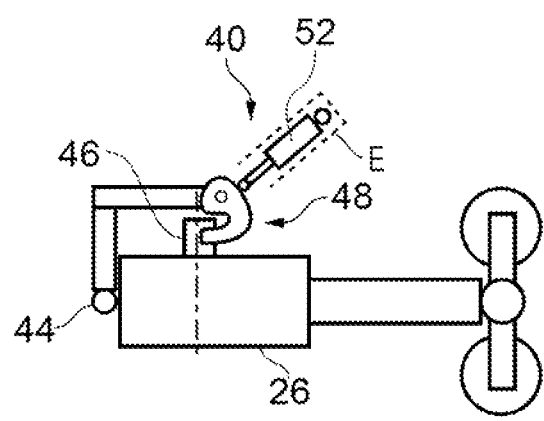

FIGS. 2f and 2g show the up-lock assembly 40 of the landing gear.

The main fitting 26 is pivotally coupled to the airframe 42 via a pivot pin 44 so as to be moveable by a retraction actuator (not shown) between a deployed condition, shown in FIG. 2f, and a stowed condition, shown in FIG. 2g.

An up-lock pin 46 is mounted on the main fitting 46 and configured to be captured by a hook 48 movably mounted to the airframe 42 via pin joint 50 so as to hold the landing gear assembly in the stowed condition.

An up-lock actuator 52 is provided to rotate the hook 48 in order to unlock the up-lock such that the landing gear can deploy. The up-lock actuator 52 can be single acting: spring biased to assume the locked condition and extensible under fluid pressure to extend or retract to unlock the up-lock hook 48. It is common for an up-lock actuator to be sized to fit within a small space E within the aircraft.

As will be appreciated from the above, various aircraft assemblies include a first part which is movable relative to a second part. When such an arrangement is present, an actuator is required in order to move the first part relative to the second part. In some cases, multiple actuators are utilized to move distinct but movably coupled parts, which can result in or a "force fight" where two actuators oppose the movement of each other, or one actuates faster than the other is capable of.

Figure 3:
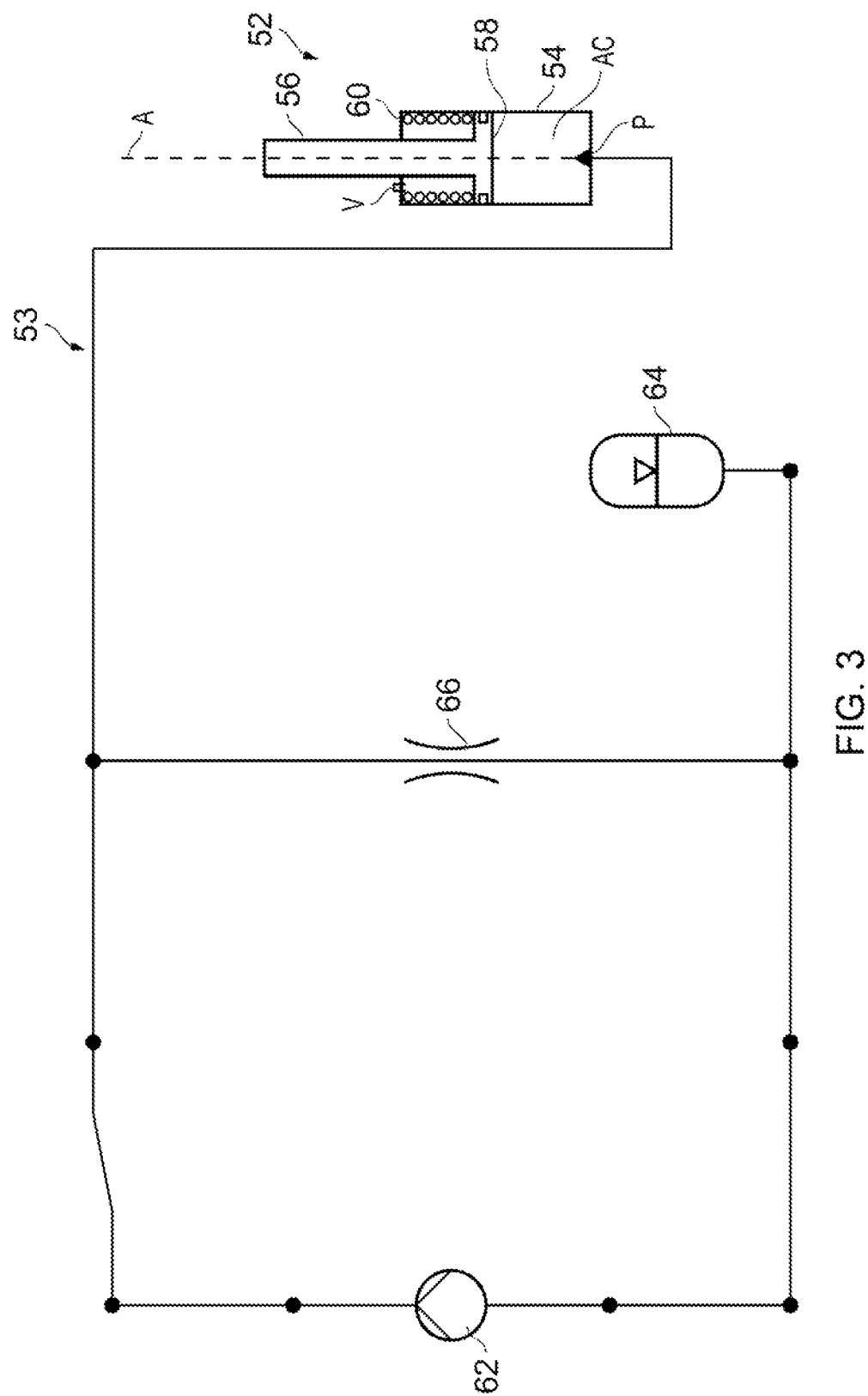
FIG. 3 is a diagram of the up-lock actuator and hydraulic supply circuit of the landing gear assembly of FIG. 2f.

FIG. 3 is a diagram of the up-lock actuator 52 of FIGS. 2f and 2g, illustrating a hydraulic fluid supply circuit 53 that drives the actuator 52. The hydraulic circuit 53 can be integrally formed with the actuator 52, or can be a separate unit coupled to it.

The up-lock actuator 52 comprises a cylinder 54 within which a piston and rod assembly 56, 58, is slidably housed so that the actuator 52 can extend and retract along a longitudinal axis A.

The actuator 52 is single acting in that the cylinder 54 includes a single port P for coupling the actuator 52 to a hydraulic circuit 53. The space within the cylinder 54 between the port P and piston 58 defines an active chamber AC that hydraulic fluid such as oil can be supplied to in order to cause the actuator 52 to, in this embodiment extend. In other embodiments the actuator 52 can be driven to compress instead by arranging the port P on the opposite side of the rod piston 58. As will be appreciated, the rod piston 58 is provided with one or more dynamic seals (not shown) arranged to move in sliding engagement with the inner surface of the cylinder 54 to inhibit fluid flow across the rod piston 58.

The hydraulic circuit 53 comprises a piezo-electric pump 62 operable to draw hydraulic fluid from a dedicated accumulator 64 and supply it under pressure to the port P of the actuator 52. The hydraulic circuit 53 further includes a flow restrictor 66 disposed in parallel with the piezo-electric pump 62 such that, as the piezo-electric pump 62 pumps hydraulic fluid to the actuator 52, a portion of the directed fluid branches back, through the restrictor 66, to the accumulator side of the pump 62. As such, the restrictor 66 can be used to control the quantity of fluid that is pumped by the pump 62. The quantity of fluid pumped by the pump 62 can also be regulated by the operational frequency of the piezo-electric pump 62.

The actuator 52 is single acting in that there is a single port P defining a single active chamber. Hydraulic fluid entering the port P into the active chamber AC forces the piston 58 towards the side of the casing 54 from which the rod 56 extends. This causes the actuator 52 to change during a first phase between first and second extension states.

On the far side of the piston 58 within the casing there is provided resilient biasing means such as a mechanical spring 60 which is compressed in this example as the actuator 52 extends such that the spring 60 provides a resilient biasing force which urges the actuator 52 to contract to a contracted condition upon removal of fluid pressure from the pump 62. The spring 60 is situated within a vented chamber, vented to atmosphere by vent port V.

As the actuator 52 contracts, fluid is forced out of the active chamber AC through the port P and the fluid can pass back to the accumulator 64 via the restrictor 66.

The present inventors have found that a piezo-electric pump 62 can drive the up-lock actuator 52 in a single direction with sufficient force to overcome the closing bias from the spring 60 to release the up-lock, providing an assembly of reduced mass, size and/or complexity in comparison to known arrangements.

Figure 4:
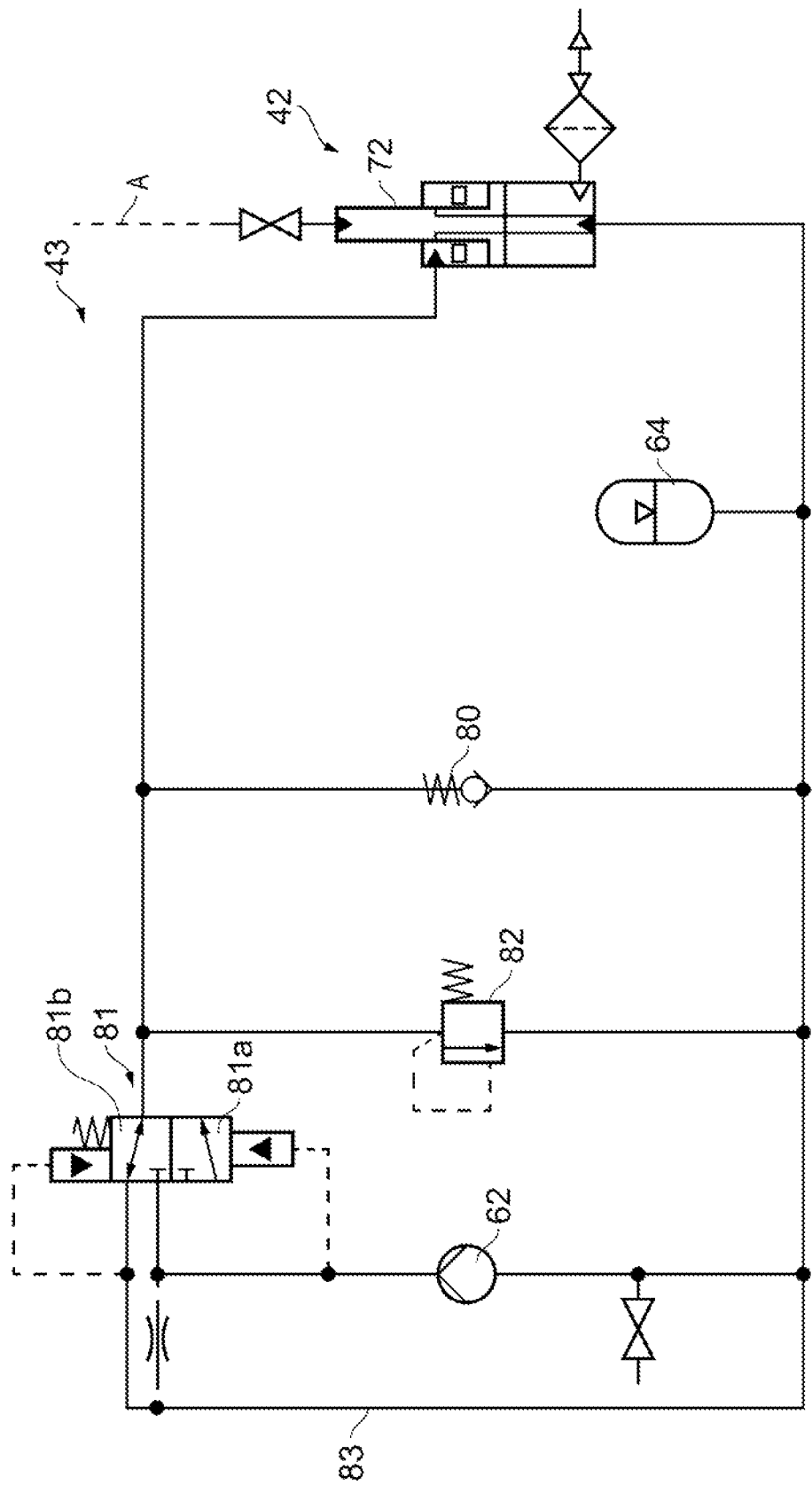
FIG. 4 is a diagram of the lock stay actuator and hydraulic supply circuit of the landing gear assembly of FIG. 2e.

FIG. 4 shows an embodiment of a down-lock or lock-stay actuator 42 of FIG. 2e and an associated hydraulic fluid supply circuit 43. The hydraulic circuit 43 can be integrally formed with the actuator 42, or can be a separate unit coupled to it.

Figure 5:
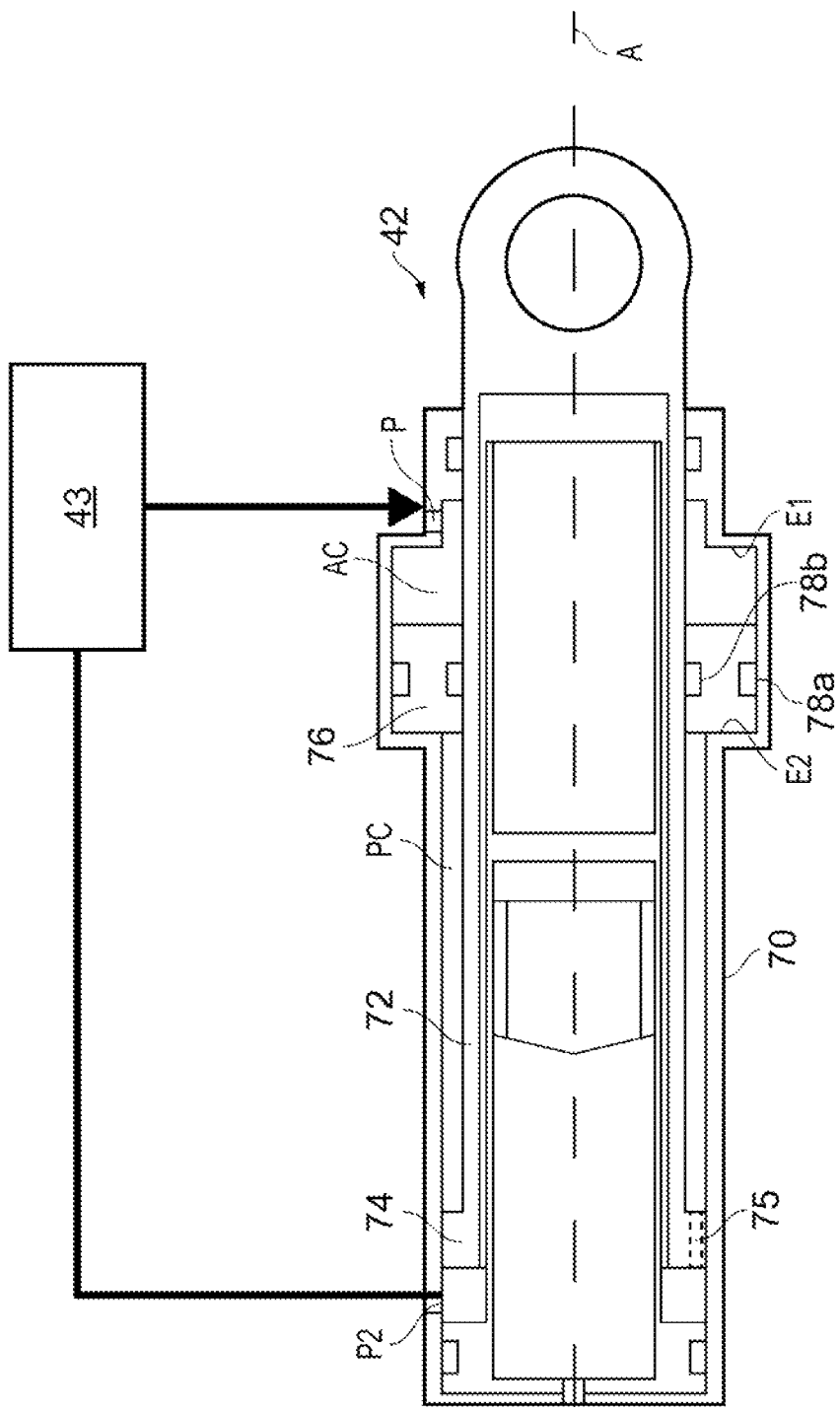
FIG. 5 is a diagram of the actuator of FIG. 4.

Referring additionally to FIG. 5, the down-lock actuator 42 comprises a cylinder 70 within which a piston and rod assembly 72, 74, is slidably housed so that the actuator 42 can extend and retract along a longitudinal axis A.

The actuator 42 is single acting in that the cylinder 70 includes a single port P for coupling the actuator 42 to the hydraulic circuit 43. The space within the cylinder 70 between the port P and piston 74 defines an active chamber AC that hydraulic fluid such as oil can be supplied to in order to cause the actuator 42 to, in this embodiment compress. In other embodiments the actuator can be driven to extend. The space within the cylinder 70 between the port P and piston 74 also defines part of a passive chamber PC which is connected via a second port P2 to the low pressure side of the hydraulic circuit 43. Fluid within the passive chamber PC can move beyond the rod piston 74 through passages 75 for example.

A movable surface of the active chamber AC is defined by an annular piston 76 which surrounds the piston rod 72. Dynamic seals 78a, 78b on the radially inward and outward surfaces of the annular piston 76 provide sealing, sliding engagement with the piston rod 72 and casing 70 respectively. The annular piston 76 can move along the axis A between end stops E1, E2 defined in this embodiment by the casing 70. The end stop E2 is sized to inhibit movement of the annular piston 76 but not inhibit movement of the rod piston 74. Thus, with actuator 42 in a fully extend condition the annular piston 76 is against end stop E1 and the rod piston 74 against the axial face of the annular piston 76 which faces away from the active chamber AC. Fluid supplied to the active chamber AC from the circuit 43 forces the annular piston 76 away from the port, which in turn pushes the rod piston 74 away from the port P, causing the actuator 42 to move through the relatively low flow first phase.

The hydraulic circuit 43 is similar in some respects to the circuit 53 of FIG. 3 and like parts have been given the same reference numerals.

The circuit 43 comprises a piezo-electric pump 62 operable to draw hydraulic fluid from a dedicated accumulator 64 and supply it under pressure to the port P of the actuator 42. It should be noted that in other embodiments the accumulator can be omitted.

A spring offset shuttle valve 81 or the like is disposed flow wise between the pump 62 and port P and has a first block 81a which places the pump 62 in fluid communication with the port P and closes a bypass branch 83 located in parallel with the pump 62 and providing fluid communication between the high and low pressure sides of the circuit 43. A second block 81b of the spring offset shuttle valve 81 isolates from pump 62 from the port P and places the port P in fluid communication with the bypass branch 83.

The spring offset shuttle valve 81 is spring biased to the second block. Operation of the pump 62 forces the first block 81a to become active, overcoming the spring bias.

The hydraulic circuit 43 further includes a one way valve 80 such as a spring biased check valve disposed in parallel with the piezo-electric pump 62. The one way valve 80 is arranged to permit fluid to flow from the low pressure side of the circuit 43 to the high pressure side, but not vice versa.

The hydraulic circuit 43 further includes a pressure relief valve 82 disposed in parallel with the piezo-electric pump 62 and arranged to open under high pressure, such as 3,200 psi, to permit fluid to pass from the high pressure side to the low pressure side.

Operation of the pump 62 switches the valve 81 to make block 81a active and causes fluid to be pumped to the active chamber AC. This forces the annular piston 76 into contact with the rod piston 74 to shorten the actuator 42 during a first phase between first and second extension states, breaking the lock stay 20.

Once the lock stay is broken, the retraction actuator can move the main strut to the stowed condition. In doing so, the retraction actuator biases the lock stay actuator 42 to further compress during a second phase between second and third extension states. In this embodiment, the independently movable rod piston 74 and annular piston 76 build a degree of lost motion into the actuator 42 in that the piston rod 72 can be driven into the casing 70 without affecting the volume of the active chamber AC and also reducing the quantity of fluid forced into the passive side of the hydraulic circuit in comparison to sealing rod piston arrangement.

When the landing gear is subsequently deployed, the actuator 42 is forced to extend during a third phase, which is also high flow in comparison to the first phase. The pump 62 is off during the third phase. During the initial portion of the third phase, extension of the actuator 42 is dampened by fluid flow within the passive chamber, including across the rod piston 74. During the latter portion of the third phase, the rod piston 74 forces the annular piston 76 to the end stop E1 closest to the port P, thereby forcing fluid into the hydraulic circuit 43.

The present inventors have found that a piezo-electric pump 62 can drive the lock stay actuator 42 in a single direction during the relatively short, low flow first phase with sufficient force to break the over-center lock stay, providing an assembly of reduced mass, size and/or complexity in comparison to known arrangements. The lost motion provided by the independent movable rod piston 74 and annular actuation piston 76 enable the actuator 42 to be easily forward driven and back driven by the retraction actuator during the relative high flow second and third phases.

Figure 6:
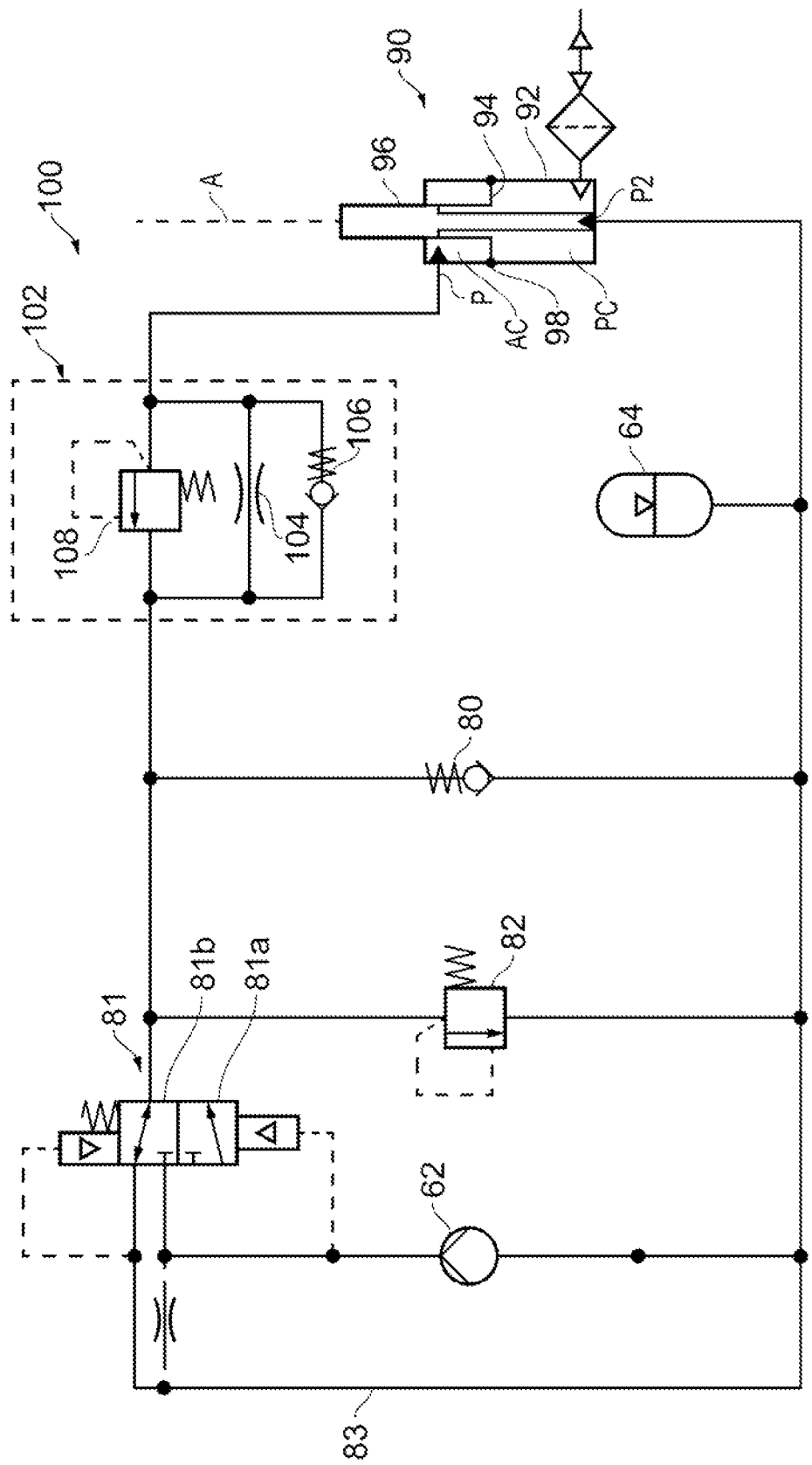
FIG. 6 is a diagram of an alternative lock stay actuator of the landing gear assembly of FIG. 2e.

FIG. 6 shows an alternative embodiment of a down-lock actuator 90 for the assembly of FIG. 2e and an associated hydraulic circuit 100.

The actuator 90 in this embodiment is a conventional single acting actuator comprising a cylinder 92 within which a piston and rod assembly 94, 96, is slidably housed so that the actuator 90 can extend and retract along a longitudinal axis A. The cylinder 792 includes a single port P for coupling the actuator 90 to the hydraulic circuit 100. The space within the cylinder 92 between the port P and piston 94 defines an active chamber AC that hydraulic fluid such as oil can be supplied to in order to cause the actuator 90 to, in this embodiment compress. In other embodiments the actuator can be driven to extend. The piston 94 includes a dynamic seal 98 arranged to provide a sliding seal between the piston 94 and the inner wall of the cylinder 92 as the piston 94 moves. In this embodiment the piston 94 acts as a divide between the active chamber AC and passive chamber PC and defines a surface of each chamber AC, PC.

The hydraulic circuit 100 is similar to the circuit 43 of FIG. 4 and like parts have been given the same reference numerals. The hydraulic circuit 100 differs from the circuit 43 in that it includes a choke 102. The choke is provided on the high pressure side of the circuit 100 between the pump 62 and the active chamber port P.

The choke 102 comprises a flow restrictor 104 arranged to control the rate of fluid flow between the pump 62 and port P when the pump is activated and forcing the actuator 90 to compress through the first phase of movement to break the lock stay 20.

Once the lock stay 20 is broken, the retraction actuator can move the main strut to the stowed condition. In doing so, the retraction actuator biases the lock stay actuator 90 to further compress though the second phase. The internal actuator fluid flow through the second phase is greater than the flow during the first phase. The choke further comprises a second check valve 106 that opens as the actuator 90 is forced to compress to account for the increase in fluid flow. The pump 62 can be on or off during the second phase. The fluid passes from the low pressure side of the circuit 100 to the high pressure side by passing around the bypass branch 83 of the circuit if the pump 62 is off or through the check valve 80 if the pump 62 is on. As the actuator 90 is driven to compress by the retraction actuator, fluid in the passive chamber PC of the actuator 90 is forced into the hydraulic circuit 100 through the second port P2.

When the landing gear is subsequently deployed, the dock lock actuator 90 is forced to extend during a third phase, which is also high flow in comparison to the first phase. The pump 62 is off during the third phase. Fluid is forced from the active chamber AC into the circuit 100, through the flow restrictor 104 in the choke 102 to the passive chamber PC.

The actuator 90 is simpler in design than the actuator 42, but the circuit 100 is more complicated due to the choke arrangement 102.

The piezoelectric pump of embodiments of the invention can take any suitable form. In one example, a pair of one way valves facing the same way spaced from one another by a housing define a chamber between them. A surface of the chamber is formed from a movable diaphragm. A piezoelectric element is arranged to move the diaphragm to draw fluid into the chamber from the inlet valve when the diaphragm moves to increase the chamber volume and expel fluid from the chamber out of the outlet valve when the diaphragm moves to decrease the chamber volume. The pump can be driven by an oscillatory high voltage/low current supply (such as up to 2000v) with frequencies typically in the range 200 to 2000 Hz. Control can be purely supply ON/supply OFF.

Thus, embodiments of the invention provide an aircraft assembly actuator driven by a piezoelectric pump. This can provide an aircraft assembly of reduced mass, size and/or complexity in comparison to known arrangements. Actuators of embodiments of the invention can reduce the number of parts subjected to wear within the actuator and/or have higher power density in compression to an electromechanical actuator. Moreover, the tolerance of piezo pumps to contaminated fluid enables the assembly to omit fluid filters within the actuator or hydraulic circuit. Moreover, the use of a piezo pump can lead to an actuator which is less prone to leakage.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
   a first part;
   a second part, the second part being movably mounted with respect to the first part;
   a single acting electro-hydraulic actuator coupled between the second part and a first anchor point, the electro-hydraulic actuator comprising:
     a cylinder defining a bore having a passive chamber,
     a piston and rod assembly slidably mounted within the bore, wherein the piston of the piston and rod assembly is shaped to permit hydraulic fluid within the passive chamber to move through or beyond the piston of the piston and rod assembly,
     an active chamber, and
     an actuation piston, which is distinct from and movable relative to the piston of the piston and rod assembly, wherein the electro-hydraulic actuator is arranged such that, during a first phase, an increase in fluid pressure in the active chamber moves the actuation piston into contact with the piston of the piston and rod assembly to move the piston of the piston and rod assembly to cause the electro-hydraulic actuator to change between first and second extension states to move the second part relative to the first part;
   wherein the electro-hydraulic actuator comprises or is coupled to a hydraulic fluid supply circuit comprising a piezo-electric pump operable to supply pressurized fluid to the active chamber to change the electro-hydraulic actuator between first and second extension states, and
   wherein the electro-hydraulic actuator comprises a resilient biasing member arranged to generate a biasing force to bias the electro-hydraulic actuator to change from the second extension state to the first extension state, the biasing force being less than that applied by the piezo-electric pump during the first phase to cause the electro-hydraulic actuator to change between first and second extension states to move the second part relative to the first part.

2. The aircraft landing gear assembly according to claim 1, further comprising:
   a main strut arranged to be movably coupled to an aircraft to be movable between a stowed condition for flight and a deployed condition for take-off and landing, the main strut being provided with an up-lock formation;
   an up-lock hook provided on the second part and being movable between an unlocking condition in which the up-lock hook is outside a swept volume of the up-lock formation as the main strut moves between the deployed and stowed conditions, and a locking condition in which the up-lock hook is at least partially within the swept volume of the up-lock formation such that the up-lock hook can engage with the up-lock formation to hold the main strut in the stowed condition, wherein the electro-hydraulic actuator comprises an up-lock actuator coupled between the up-lock hook and an up-lock anchor point such that as the electro-hydraulic actuator changes between first and second extension states the up-lock hook releases the up-lock formation.

3. The aircraft landing gear assembly according to claim 1, wherein the assembly is arranged such that the second part can be moved relative to the first part with an input of less than or equal to 500 Watts.

4. The aircraft landing gear assembly according to claim 1, further comprising an accumulator for storing hydraulic fluid, the accumulator being provided in fluid communication with the piezo-electric pump.

5. The aircraft landing gear assembly according to claim 4, wherein the accumulator is dedicated to the electro-hydraulic actuator.

6. The aircraft landing gear assembly according to claim 1, wherein the piezo-electric pump is dedicated to the electro-hydraulic actuator.

7. The aircraft landing gear assembly according to claim 1, wherein the electro-hydraulic actuator and the piezo-electric pump are formed at least partially contained within a housing.

8. The aircraft landing gear assembly according to claim 1, wherein the electro-hydraulic actuator, the piezo-electric pump and an accumulator are formed at least partially contained within a housing.

9. An aircraft landing gear assembly comprising:
a main strut arranged to be movably coupled to an aircraft to be movable between a stowed condition for flight and a deployed condition for take-off and landing;
a multi linkage side stay coupled between the main strut and a side stay anchor point and having a locking condition in which the multi linkage side stay reacts attempted movement of the main strut from the deployed position and a passive condition in which the stay permits movement of the main strut to the stowed condition;
a multi linkage lock stay coupled between the multi linkage side stay and a lock stay anchor point and having a locking condition in which the multi linkage lock stay reacts attempted movement of the multi linkage side stay from the locking condition and a passive condition in which the multi linkage lock stay permits movement of the main strut to the stowed condition,
a first part;
a linkage of the multi linkage lock stay, the linkage of the multi linkage lock stay being movably mounted with respect to the first part;
an electro-hydraulic actuator coupled between the linkage of the multi linkage lock stay and a first anchor point, the electro-hydraulic actuator comprising: a cylinder defining a bore and a piston and rod assembly slidably mounted within the bore and an active chamber within which an increase in fluid pressure causes the electro-hydraulic actuator to change during a first phase between first and second extension states to move the second part relative to the first part,
wherein the electro-hydraulic actuator comprises or is coupled to a hydraulic fluid supply circuit comprising a piezo-electric pump operable to supply pressurized fluid to the active chamber to change the electro-hydraulic actuator between first and second extension states,
wherein the electro-hydraulic actuator is arranged during the first phase to apply an unlocking force to the multi linkage lock stay to change the multi linkage lock stay from the locking condition to the unlocking condition, and
wherein the assembly further comprises a retraction actuator arranged to move the main strut between the deployed and stowed conditions, wherein once a lock stay actuator has attained the second extension state, operation of the retraction actuator biases the lock stay actuator to change during a second phase to a third extension state in which the main strut is in the stowed condition.

10. The aircraft landing gear assembly according to claim 9, wherein the electro-hydraulic actuator further comprises a passive chamber on an opposite side of the piston with respect to the active chamber, the passive chamber containing hydraulic fluid in fluid communication with an accumulator, wherein the hydraulic fluid supply circuit further comprises a pump bypass check valve arranged in parallel with the piezo-electric pump, the pump bypass check valve being arranged to permit flow of hydraulic fluid from the passive chamber to the active chamber but inhibit the flow of hydraulic fluid from the active chamber to the passive chamber.

11. The aircraft landing gear assembly according to claim 10, wherein the increase in fluid pressure causes the electro-hydraulic actuator to change during the first phase between the first and second extension states due to fluid acting directly on the piston.

12. The aircraft landing gear assembly according to claim 9, wherein the hydraulic fluid supply circuit further comprises a choke assembly disposed flow-wise between the piezo-electric pump and active chamber, the choke assembly comprising a choke flow restrictor in parallel with a choke check valve, the choke check valve being biased closed and being arranged to open under fluid pressure when the retraction actuator biases the lock stay actuator to change during the second phase to the third extension state.

13. The aircraft landing gear assembly according to claim 12, wherein the choke assembly further comprises a pressure release valve configured to open if the reverse flow of fluid, from the active chamber through the choke flow restrictor towards an accumulator, exceeds a predetermined pressure.

14. The aircraft landing gear assembly according to claim 12, wherein the electro-hydraulic actuator comprises an actuation piston which is distinct from and movable relative to the piston of the piston and rod assembly, the electro-hydraulic actuator being arranged such that an increase in fluid pressure in the active chamber causes the electro-hydraulic actuator to change during the first phase between the first and second extension states due to fluid acting on the actuation piston which moves into contact with the piston of the piston and rod assembly to move the piston of the piston and rod assembly to cause the electro-hydraulic actuator to change between the first and second extension states.

15. The aircraft landing gear assembly according to claim 10, wherein the piston of the piston and rod assembly is shaped to permit hydraulic fluid within the passive chamber to move through or beyond it.

16. The aircraft landing gear assembly according to claim 9, wherein the assembly is arranged such that the second part can be moved relative to the first part with an input of less than or equal to 500 Watts.

17. The aircraft landing gear assembly according to claim 9, further comprising an accumulator for storing hydraulic fluid, the accumulator being provided in fluid communication with the piezo-electric pump.

18. The aircraft landing gear assembly according to claim 9, further comprising an accumulator for storing hydraulic fluid, the accumulator being provided in fluid communication with the piezo-electric pump and wherein the accumulator is dedicated to the electro-hydraulic actuator.

19. The aircraft landing gear assembly according to claim 9, wherein the piezo-electric pump is dedicated to the electro-hydraulic actuator.

20. The aircraft landing gear assembly according to claim 9, wherein the electro-hydraulic actuator and the piezo-electric pump are formed at least partially contained within a housing.

21. The aircraft landing gear assembly according to claim 18, wherein the electro-hydraulic actuator, the piezo-electric pump and the accumulator are formed at least partially contained within a housing.

22. An aircraft including one or more aircraft landing gear assemblies according to claim 1.

* * * * *